(12) United States Patent
Sanap et al.

(10) Patent No.: US 12,493,978 B2
(45) Date of Patent: Dec. 9, 2025

(54) METHOD AND SYSTEM FOR POINT CLOUD BASED GRASP PLANNING FRAMEWORK

(71) Applicant: Tata Consultancy Services Limited, Mumbai (IN)

(72) Inventors: Vipul Ashok Sanap, Pune (IN); Aniruddha Singhal, New Delhi (IN); Laxmidhar Behera, New Delhi (IN); Rajesh Sinha, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 314 days.

(21) Appl. No.: 18/235,020

(22) Filed: Aug. 17, 2023

(65) Prior Publication Data

US 2024/0070900 A1   Feb. 29, 2024

(30) Foreign Application Priority Data

Aug. 17, 2022   (IN) .............................. 202221046849

(51) Int. Cl.
 *G06T 7/73* (2017.01)
 *B25J 9/16* (2006.01)
 *G06T 7/55* (2017.01)

(52) U.S. Cl.
 CPC .............. *G06T 7/73* (2017.01); *B25J 9/1697* (2013.01); *G06T 7/55* (2017.01)

(58) Field of Classification Search
 CPC ... G06T 7/73; G06T 7/55; B25J 9/1697; B25J 9/1612; G05B 2219/39536; G05B 2219/40053
 See application file for complete search history.

(56) References Cited

U.S. PATENT DOCUMENTS

2024/0408766 A1\* 12/2024 Wiersma ................ G06V 10/82

OTHER PUBLICATIONS

Jo et al., "Object-Independent Grasping in Heavy Clutter," Appl. Sci., 10 (2020).
Pharswan et al., "Domain Independent Unsupervised Learning to grasp the Novel Objects," (2020).
Vohra et al., "Real-time Grasp Pose Estimation for Novel Objects in Densely Cluttered Environment," (2019).

\* cited by examiner

*Primary Examiner* — Chan S Park
*Assistant Examiner* — Daniel C Chang
(74) *Attorney, Agent, or Firm* — Finnegan, Henderson, Farabow, Garrett & Dunner, LLP

(57) ABSTRACT

A fully automated and reliable picking of a diverse range of unseen objects in clutter is a challenging problem. The present disclosure provides an optimum grasp pose selection to pick an object from a bin. Initially, the system receives an input image pertaining to a surface. Further, a plurality of sampled grasp poses are generated in a random configuration. Further, a depth difference value is computed for each of a plurality of pixels corresponding to each of the plurality of sampled grasp poses. Further, a binary map is generated for each of the plurality of sampled grasp poses and a plurality of subregions are obtained. Further, a plurality of feasible grasp poses are selected based on the plurality of subregions and a plurality of conditions. Further, the plurality of feasible grasp poses are refined and an optimum grasp pose is obtained based on a Grasp Quality Score (GQS).

12 Claims, 11 Drawing Sheets

| Grasp Pose ID | Grasp Pose | FRL score | CRS score |
|---|---|---|---|
| 1 |  | 100 | 100 |
| 3 |  | 63 | 100 |
| 5 |  | 78 | 100 |
| 6 |  | 84 | 90 |

US 12,493,978 B2

METHOD AND SYSTEM FOR POINT CLOUD BASED GRASP PLANNING FRAMEWORK

PRIORITY CLAIM

This U.S. patent application claims priority under 35 U.S.C. § 119 to: Indian Provisional Application No. 202221046849, filed on Aug. 17, 2022. The entire contents of the aforementioned application are incorporated herein by reference.

TECHNICAL FIELD

The disclosure herein generally relates to the field of image processing and, more particularly, to a method and system for point cloud based grasp planning framework.

BACKGROUND

Universal Picking (UP) is defined as the ability of robots to pick diverse and novel objects reliably. It is a much desired skill to facilitate automation in manufacturing units, warehouses, retail stores, home services, etc., for bin picking. Other desirable attributes of UP are real-time execution, ease of deployment, and reconfiguration requiring minimal technical expertise. In the context of autonomous robotic manipulation, the problem becomes highly challenging if the target objects are lying together randomly in a pile. Additionally, the objects in the real world have unlimited combinations of color, texture, shape, size, materials, etc. Sensor noise, errors in calibration and the inherent uncertainty in robot actuation further convolute the problem to a greater degree.

Bin picking (picking objects from bin) solutions can be categorized based on the level of clutter used for experiments, namely no-clutter (isolated objects), semi-clutter (few well separated objects lying together) and dense-clutter (objects in heavy clutter as a random pile). Bin-picking solutions for unseen objects in dense-clutter category is a challenging task. For example, it is quite difficult to properly segment unseen objects or estimate their pose in clutter due to occlusions and unlimited variations, and diversity amongst real-world objects.

Conventional methods for bin picking in dense clutter environment initially sample some number of candidate grasp poses within the workspace and then evaluate them using some grasp quality index to select a best among them for the grasp action. Some other approaches learns hand-eye coordination by training a large Convolutional Neural Network (CNN) that predicts a grasp success probability given the task space motion of the gripper. However, to train the CNN its needed to collect thousands of data samples which is a time consuming process. This limitation was mitigated by learning a CNN for grasp quality index entirely over simulated dataset generated using the depth scans of adversarial training objects. However, the grasp quality of so trained CNN models are found to be sensitive to certain parameters used during dataset generation such as the robot gripper, the depth camera, the distance between the camera and workspace. Thus, any change in the above parameters would require repeating the entire training procedure to get the same level of performance. Some deep learning-based methods have been also used conventionally. However, in general, all the methods discussed above are domain-dependent i.e., these methods often fail to perform equally well on a target domain if it is somewhat different from the source domain they are trained upon.

SUMMARY

Embodiments of the present disclosure present technological improvements as solutions to one or more of the above-mentioned technical problems recognized by the inventors in conventional systems. For example, in one embodiment, a method for Point cloud based grasp planning framework is provided. The method includes receiving, by one or more hardware processors, an input image pertaining to a surface in a robotic bin picking environment, wherein the surface comprises a plurality of heterogenous unseen objects. Further, the method includes generating, by the one or more hardware processors, a plurality of sampled grasp poses in a random configuration based on the input image, using a baseline grasp planning technique, wherein each of the plurality of sampled grasp poses is represented as rectangles. Furthermore, the method includes computing by the one or more hardware processors, a depth difference value for each of a plurality of pixels corresponding to each of the plurality of sampled grasp poses, based on a comparison between each of the plurality of pixels corresponding to each of the plurality of sampled grasp poses and a corresponding center pixel. Furthermore, the method includes generating, by the one or more hardware processors, a binary map for each of the plurality of sampled grasp poses based on the corresponding depth difference value by assigning a binary value one to a plurality of pixels with a depth difference value greater than a predefined depth threshold and zero otherwise. Furthermore, the method includes obtaining (310), by the one or more hardware processors, a plurality of subregions corresponding to each of the plurality of sampled grasp poses based on the corresponding binary map, wherein the plurality of subregions comprises a contact region, a free region and a collision region by (i) identifying a left starting point and a left ending point of a left free region of each of the plurality of sampled grasp poses based on the corresponding binary map, wherein the left free region is a region with the binary value one (ii) identifying a right starting point and a right ending point of a right free region of each of the plurality of sampled grasp poses based on the corresponding binary map and (iii) computing the plurality of subregions based on the left starting point, the left ending point, the right starting point and the right ending point using a subregion computation technique. Furthermore, the method includes selecting, by the one or more hardware processors, a plurality of feasible grasp poses from the plurality of sampled grasp poses based on the plurality of subregions and a plurality of conditions. Furthermore, the method includes refining, by the one or more hardware processors, each of the plurality of feasible grasp poses by (i) shifting a center corresponding to each of the plurality of feasible grasp poses along width of the corresponding grasp pose such that the corresponding contact region is divided into two equal halves, and (ii) adjusting the width corresponding to each of the plurality of feasible grasp poses such that the corresponding collision region is excluded. Finally, the method includes obtaining, by the one or more hardware processors, an optimum grasp poses for a robotic arm based on a refined plurality of feasible grasp poses using a Grasp Quality Score (GQS).

In another aspect, a system for Point cloud based grasp planning framework is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a surface in a robotic bin picking environment, wherein the surface comprises a plurality of heterogenous unseen objects. Further, the one or more hardware processors are configured by the programmed instructions to generate a plurality of sampled grasp poses in a random configuration based on the input image, using a baseline grasp planning technique, wherein each of the plurality of sampled grasp poses is represented as rectangles. Furthermore, the one or ore hardware processors are configured by the programmed instructions to compute a depth difference value for each of a plurality of pixels corresponding to each of the plurality of sampled grasp poses, based on a comparison between each of the plurality of pixels corresponding to each of the plurality of sampled grasp poses and a corresponding center pixel. Furthermore, the one or more hardware processors are configured by the programmed instructions to generate a binary map for each of the plurality of sampled grasp poses based on the corresponding depth difference value by assigning a binary value one to a plurality of pixels with a depth difference value greater than a predefined depth threshold and zero otherwise. Furthermore, the one or more hardware processors are configured by the programmed instructions to obtain a plurality of subregions corresponding to each of the plurality of sampled grasp poses based on the corresponding binary map, wherein the plurality of subregions comprises a contact region, a free region and a collision region by (i) identifying a left starting point and a left ending point of a left free region of each of the plurality of sampled grasp poses based on the corresponding binary map, wherein the left free region is a region with the binary value one (ii) identifying a right starting point and a right ending point of a right free region of each of the plurality of sampled grasp poses based on the corresponding binary map and (iii) computing the plurality of subregions based on the left starting point, the left ending point, the right starting point and the right ending point using a subregion computation technique. Furthermore, the one or more hardware processors are configured by the programmed instructions to select a plurality of feasible grasp poses from the plurality of sampled grasp poses based on the plurality of subregions and a plurality of conditions. Furthermore, the one or more hardware processors are configured by the programmed instructions to refine each of the plurality of feasible grasp poses by (i) shifting a center corresponding to each of the plurality of feasible grasp poses along width of the corresponding grasp pose such that the corresponding contact region is divided into two equal halves, and (ii) adjusting the width corresponding to each of the plurality of feasible grasp poses such that the corresponding collision region is excluded. Finally, the one or more hardware processors are configured by the programmed instructions to obtain an optimum grasp poses for a robotic arm based on a refined plurality of feasible grasp poses using a Grasp Quality Score (GQS).

In yet another aspect, a computer program product including a non-transitory computer-readable medium having embodied therein a computer program for Point cloud based grasp planning framework is provided. The computer readable program, when executed on a computing device, causes the computing device to receive a surface in a robotic bin picking environment, wherein the surface comprises a plurality of heterogenous unseen objects. Further, the computer readable program, when executed on a computing device, causes the computing device to generate a plurality of sampled grasp poses in a random configuration based on the input image, using a baseline grasp planning technique, wherein each of the plurality of sampled grasp poses is represented as rectangles. Furthermore, the computer readable program, when executed on a computing device, causes the computing device to compute a depth difference value for each of a plurality of pixels corresponding to each of the plurality of sampled grasp poses, based on a comparison between each of the plurality of pixels corresponding to each of the plurality of sampled grasp poses and a corresponding center pixel. Furthermore, the computer readable program, when executed on a computing device, causes the computing device to generate a binary map for each of the plurality of sampled grasp poses based on the corresponding depth difference value by assigning a binary value one to a plurality of pixels with a depth difference value greater than a predefined depth threshold and zero otherwise. Furthermore, the computer readable program, when executed on a computing device, causes the computing device to obtain a plurality of subregions corresponding to each of the plurality of sampled grasp poses based on the corresponding binary map, wherein the plurality of subregions comprises a contact region, a free region and a collision region by (i) identifying a left starting point and a left ending point of a left free region of each of the plurality of sampled grasp poses based on the corresponding binary map, wherein the left free region is a region with the binary value one (ii) identifying a right starting point and a right ending point of a right free region of each of the plurality of sampled grasp poses based on the corresponding binary map and (iii) computing the plurality of subregions based on the left starting point, the left ending point, the right starting point and the right ending point using a subregion computation technique. Furthermore, the computer readable program, when executed on a computing device, causes the computing device to select a plurality of feasible grasp poses from the plurality of sampled grasp poses based on the plurality of subregions and a plurality of conditions. Furthermore, the computer readable program, when executed on a computing device, causes the computing device to refine each of the plurality of feasible grasp poses by (i) shifting a center corresponding to each of the plurality of feasible grasp poses along width of the corresponding grasp pose such that the corresponding contact region is divided into two equal halves, and (ii) adjusting the width corresponding to each of the plurality of feasible grasp poses such that the corresponding collision region is excluded. Finally, the computer readable program, when executed on a computing device, causes the computing device to obtain an optimum grasp poses for a robotic arm based on a refined plurality of feasible grasp poses using a Grasp Quality Score (GQS).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

In an embodiment.

In an embodiment.

DETAILED DESCRIPTION

Figure 1:
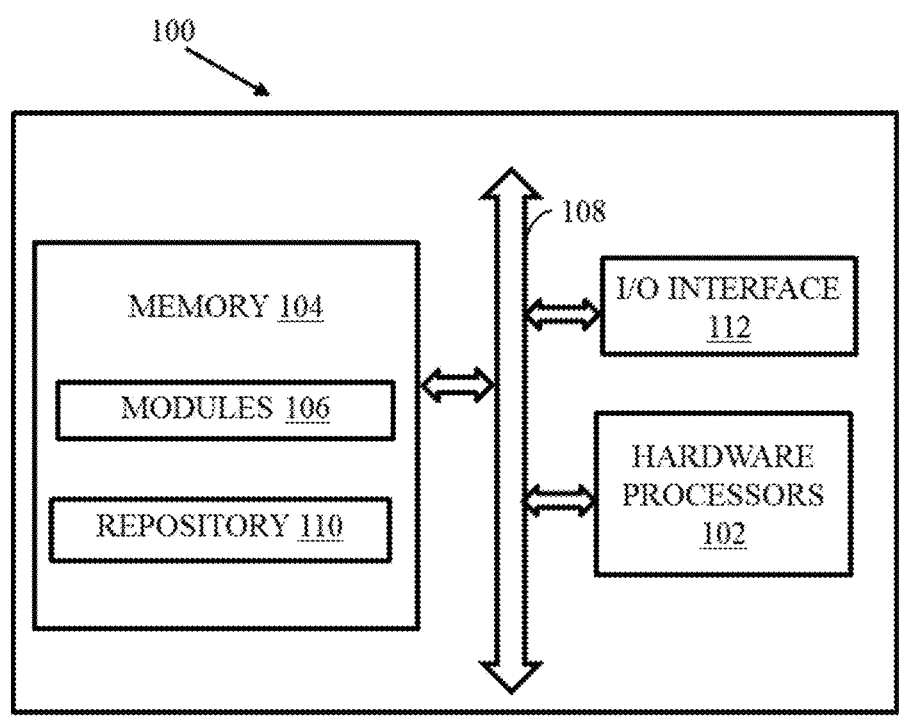
FIG. 1 is a functional block diagram of a system for point cloud based grasp planning framework, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

A fully automated and reliable picking of a diverse range of previously unseen objects in clutter is a challenging problem. This becomes even more difficult given the inherent uncertainty in sensing, control, and interaction physics. Conventional methods for bin picking (picking objects from bin by a robot or robotic arm) in dense clutter environment are domain-dependent i.e., these methods often fail to perform equally well on a target domain if it is somewhat different from the source domain they are trained upon.

Embodiments herein provide a method and system for point cloud based grasp planning framework to obtain an optimum grasp pose to pick an object from a bin by a robotic arm. The present disclosure provides a domain independent novel grasp planning framework that is based on the depth data coming from an Reg Green Blue-Depth (RGB-D) sensor. Further, the present disclosure includes an unsupervised clustering-based grasp pose sampler, a grasp pose validation step based on a grasp feasibility map, a grasp pose refinement, and a grasp pose quality ranking scheme to obtain the optimum grasp pose.

Initially, the system receives an input image pertaining to a surface in a robotic bin picking environment. The surface includes a plurality of heterogenous unseen objects. Further, a plurality of sampled grasp poses generated in a random configuration based on the input image using a baseline grasp planning technique, wherein each of the plurality of sampled grasp poses are represented as rectangles. Post generating sampled grasp poses, a depth difference value is computed for each of a plurality of pixels corresponding to each of the plurality of sampled grasp poses based on a comparison between each of the plurality of pixels corresponding to each of the plurality of sampled grasp poses and a corresponding center pixel. Further, a binary map is generated for each of the plurality of sampled grasp poses based on the corresponding depth difference value by assigning a binary value one to a plurality of pixels with a depth difference value greater than a predefined depth threshold and zero otherwise. After generating binary map, a plurality of subregions are obtained corresponding to each of the plurality of sampled grasp poses based on the corresponding binary map. The plurality of subregions comprises a contact region, a free region and a collision region. Further, a plurality of feasible grasp poses are selected from the plurality of sampled grasp poses based on the plurality of subregions and a plurality of conditions. Further, each of the plurality of feasible grasp poses are refined by shifting the center of the contact region and adjusting the width of the feasible grasp poses by excluding the collision region. Finally, an optimum grasp pose is obtained based on the refined plurality of feasible grasp poses using a Grasp Quality Score (GQS).

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of an point cloud based grasp planning framework, in accordance with some embodiments of the present disclosure. The system 100 includes or is otherwise in communication with hardware processors 102, at least one memory such as a memory 104 an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2A:
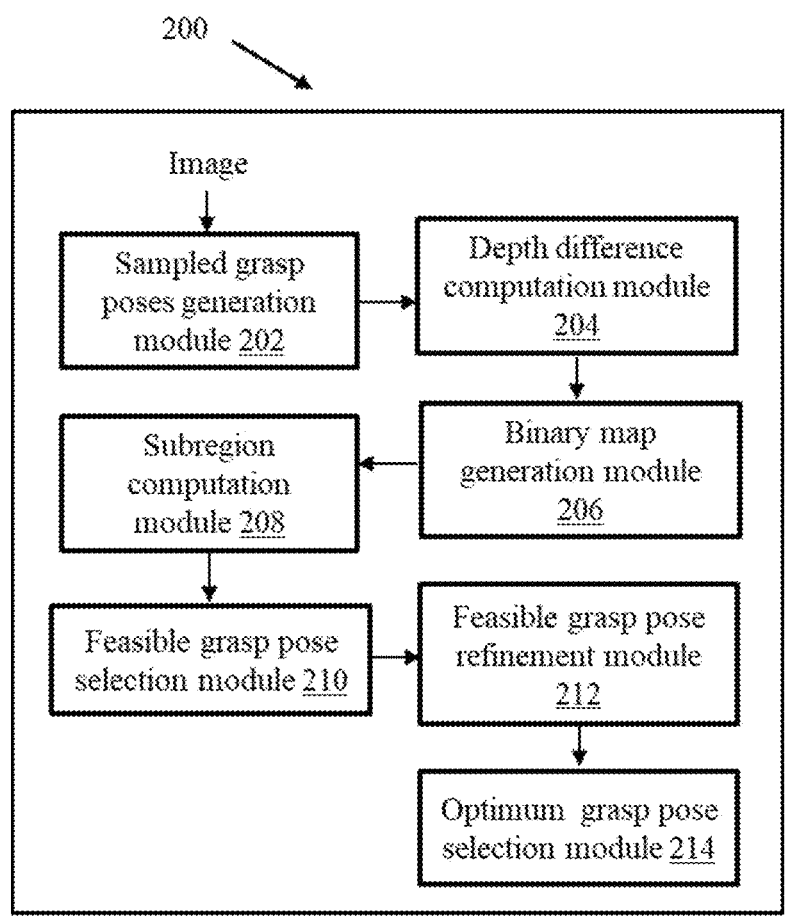
FIG. 2A illustrates a functional architecture of the system of FIG. 1, for point cloud based grasp planning framework, in accordance with some embodiments of the present disclosure.

The plurality of modules 106 include programs or coded instructions that supplement applications or functions performed by the system 100 for point cloud based grasp planning framework. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 includes a sampled grasp poses generation module (shown in FIG. 2A), a depth difference computation module (shown in FIG. 2A), a binary map generation module (shown in FIG. 2A), a subregion computation module (shown in FIG. 2A), a feasible grasp pose selection module (shown in FIG. 2A), a feasible grasp pose refinement module and an optimum grasp pose selection module (shown in FIG. 2A). In an embodiment, FIG. 2A illustrates a functional architecture of the system of FIG. 1, for point cloud based grasp planning framework, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 3, FIGS. 6A and FIG. 6B.

Figure 2B:
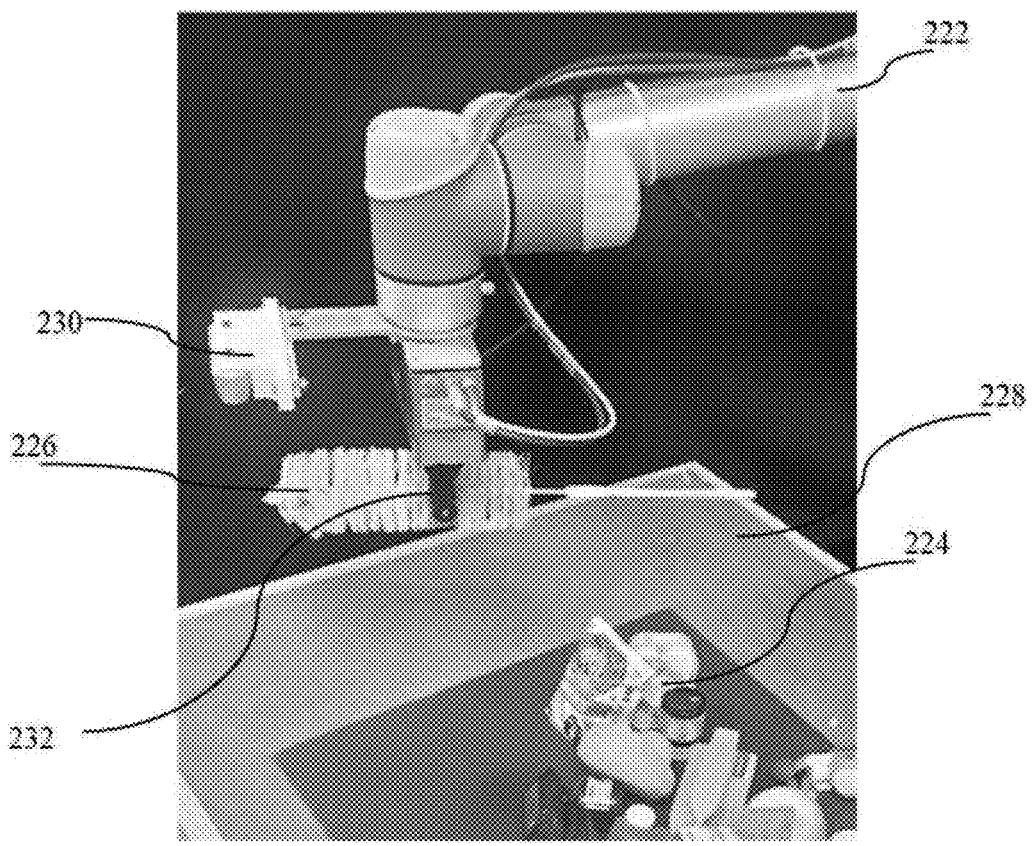
FIG. 2B illustrates an example robotic bin picking environment for point cloud based grasp planning framework, in accordance with some embodiments of the present disclosure.

FIG. 2B illustrates an example robotic bin picking environment for point cloud based grasp planning framework, in accordance with some embodiments of the present disclosure. Now referring to FIG. 2B, the robotic bin picking environment includes the plurality of heterogenous unseen objects 224 to be picked by a robotic arm 222 (for example, a Universal Robot5 6-Degrees of Freedom (UR5 6-DOF) manipulator arm), at least one image capturing device 230 (for example, a real sense D-435i camera), a gripper 232 (for example, a WSG-50 Schunk gripper), a bin 228 with the plurality of heterogenous unseen objects 224, and a receptacle for object drop location (not shown in FIG. 2B). In an embodiment, the bin 228 is designed with slanted edges (at some angle approximately 45 degrees) so that not only do the objects remain within the workspace during the operation but also the collision chances of the gripper with the bin edges are lesser compared to the bins with vertical edges. In an embodiment, 226 is the object picked by the robotic arm 222. In an embodiment, the robotic arm 222 is connected to the system 100 through I/O interface 112 to send data from the at least one image capturing device 230 and to receive instructions (for example, the instruction can be either to pick an object from the plurality of heterogenous unseen objects or to disperse the plurality of heterogenous unseen objects) from the one or more hardware processors 102 of system 100.

Figure 3A:
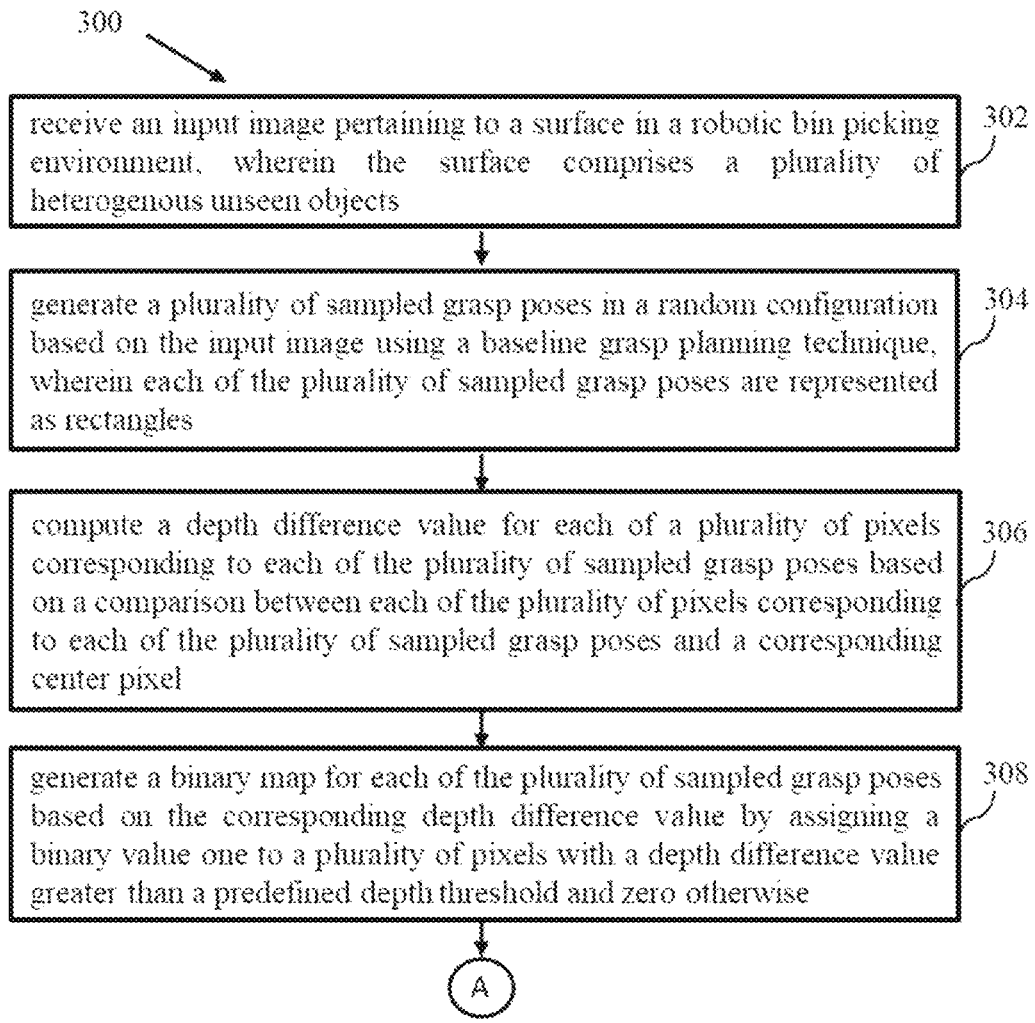
FIG. 3 is an exemplary flow diagram illustrating a processor implemented method 300 for point cloud based grasp planning framework implemented by the system of FIG. 1 according to some embodiments of the present disclosure.
Figure 3B:
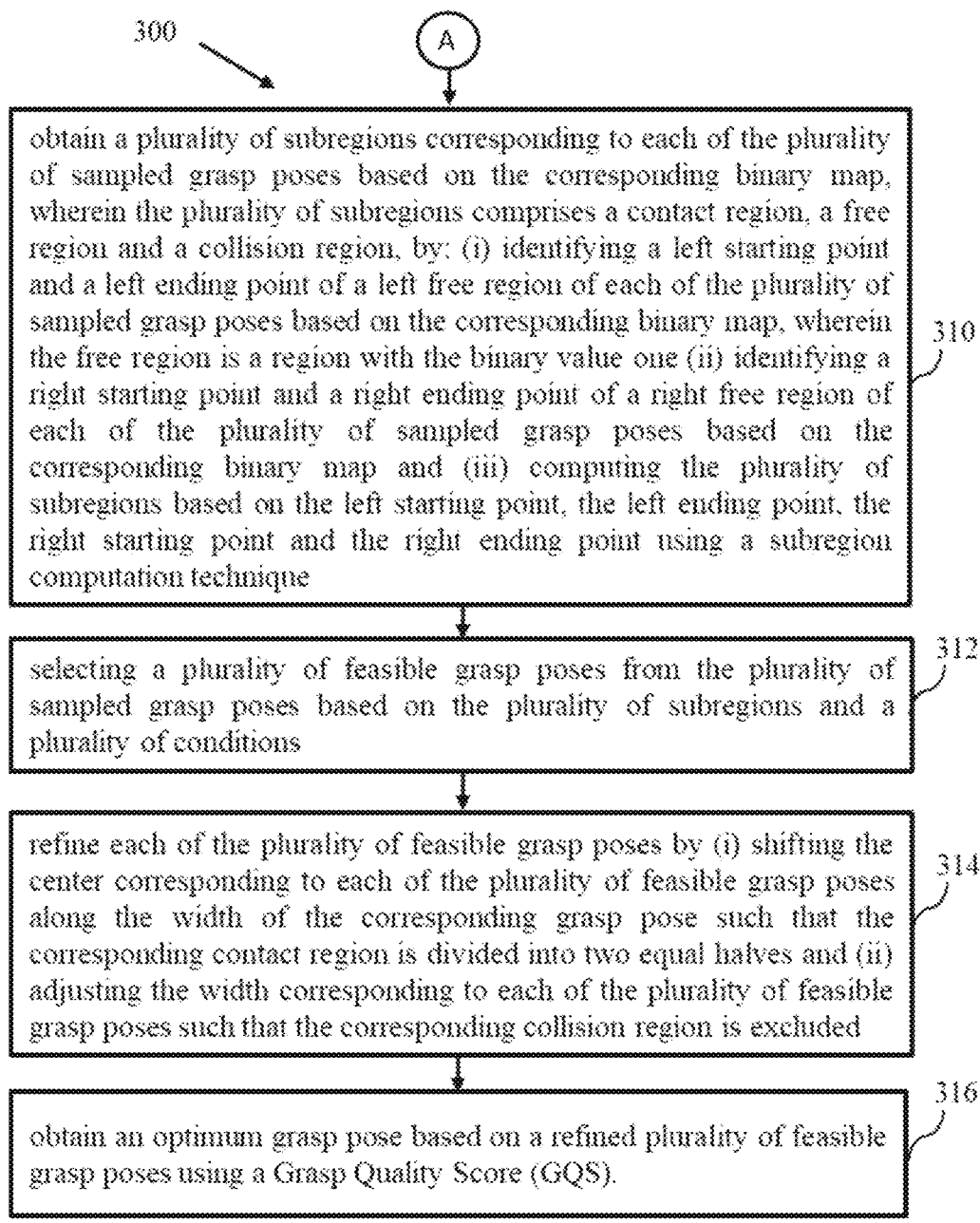

FIG. 3 is an exemplary flow diagram illustrating a method 300 for point cloud based grasp planning framework implemented by the system of FIG. 1 according to some embodiments of the present disclosure. In an embodiment, the system 100 includes one or more data storage devices or the memory 104 operatively coupled to the one or ore hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

Figure 4A:
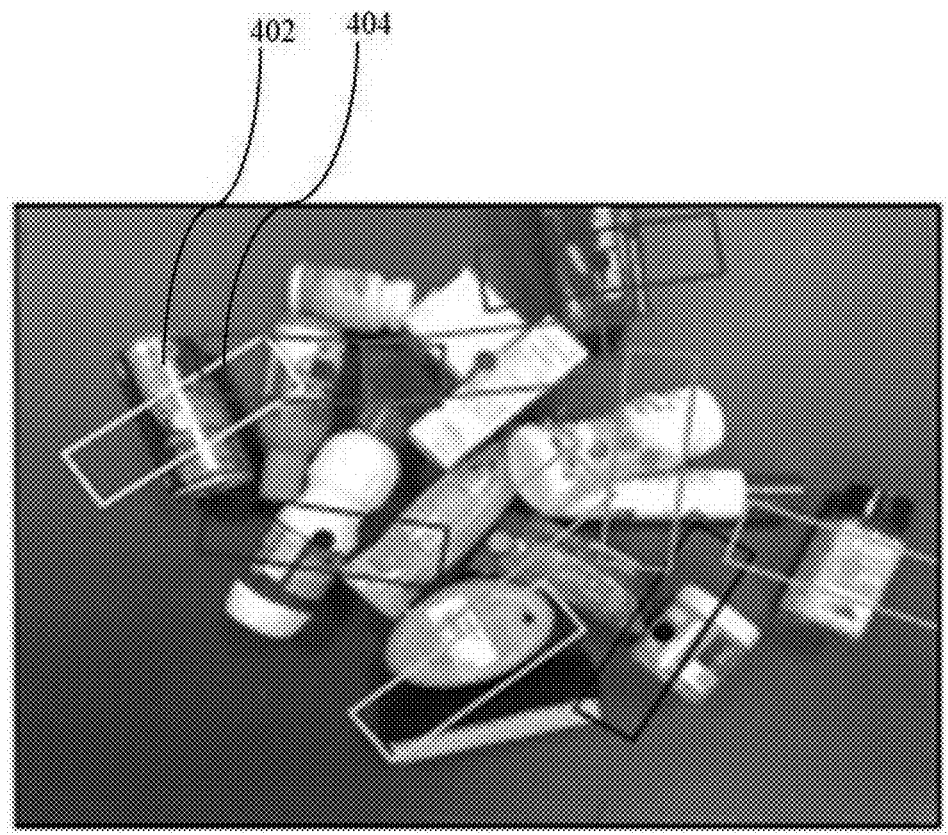
FIGS. 4A and 4B illustrates example input and sampled grasp poses for the processor implemented method for point cloud based grasp planning framework implemented by the system of FIG. 1 according to some embodiments of the present disclosure.

At step 302 of the method 300, the one or more hardware processors 102 are configured by the programmed instructions to receive the input image pertaining to the surface. The surface includes the plurality of heterogenous unseen objects as shown in FIG. 4A, In another embodiment, the surface may include homogeneous unseen objects.

At step 304 of the method 300, the sampled grasp poses generation module 202 executed by one or more hardware processors 102 is configured by the programmed instructions to generate the plurality of sampled grasp poses $G_i$ in a random configuration based on the input image using a baseline grasp planning technique.

$$G_i=(p,\theta_i,W_i,Q) \quad (1)$$

where, p=(x, y) refers to the center point of the grasp pose in the image coordinates, $\theta_i$ denotes the angle of the grasp pose with respect to the horizontal axis in the image plane, $W_i$ refers to the width of the grasp pose rectangle, and Q denotes the grasp quality index. For the execution of the grasp pose $G_i$, it needs to be converted in accordance with the robot's world Cartesian frame. For this conversion intrinsic and extrinsic camera parameters are utilized that are obtained by standard calibration procedure. The converted grasp pose Gr can be defined as follows:

$$G_r=(p,\theta_r,W_r,Q) \quad (2)$$

where, p=(x, y, z) refers to the center point of the grasp pose in Cartesian space, _r represents the gripper's rotation around the z-axis, $W_r$ denotes the required opening width of the gripper bounded by the maximum opening of the gripper, and quantity Q is the same as defined in the equation (1). In an embodiment, the depth values used in the pseudocode are expressed in the camera reference frame. The camera is set above the bin workspace to a fixed distance facing downwards. N number of candidate grasp poses are sampled using a depth filtering and clustering-based approach.

Figure 4B:
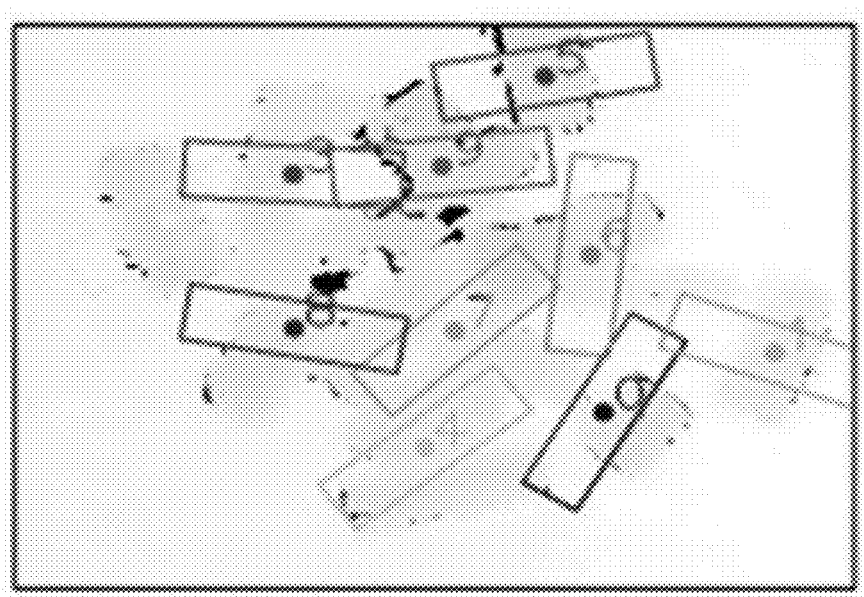

For example, each of the plurality of sampled grasp poses is represented as rectangles as shown in FIGS. 4A and 4B. Now referring to FIG. 4A, 402 is an object from the plurality of heterogenous unseen objects and 404 is the sampled grasp pose associated with the object 404. FIG. 4B illustrates the plurality sampled grasp poses, wherein each rectangle is generated corresponding to each of the plurality of the heterogenous unseen objects shown in FIG. 4A.

At step 306 of the method 300 the depth difference computation module 204 executed by the one or more hardware processors 102 is configured by the programmed instructions to compute the depth difference value for each of a plurality of pixels corresponding to each of the plurality of sampled grasp poses based on a comparison between each of the plurality of pixels corresponding to each of the plurality of sampled grasp poses and a corresponding center pixel.

At step 308 of the method 300, the binary map generation module 204 executed by the one or more hardware processors 102 is configured by the programmed instructions to generate the binary map for each of the plurality of sampled grasp poses based on the corresponding depth difference value by assigning the binary value one to a plurality of pixels with the depth difference value greater than the predefined depth threshold and zero otherwise.

At step 310 of the method 300, the subregion computation module 204 executed by the one or more hardware processors 102 is configured by the programmed instructions to obtain the plurality of subregions corresponding to each of the plurality of sampled grasp poses based on the corresponding binary map. In an embodiment, the plurality of subregions includes a contact region ($R_{ct}$), a free region ($R_{fs}$) and a collision region ($R_{cl}$).

Figure 4C:
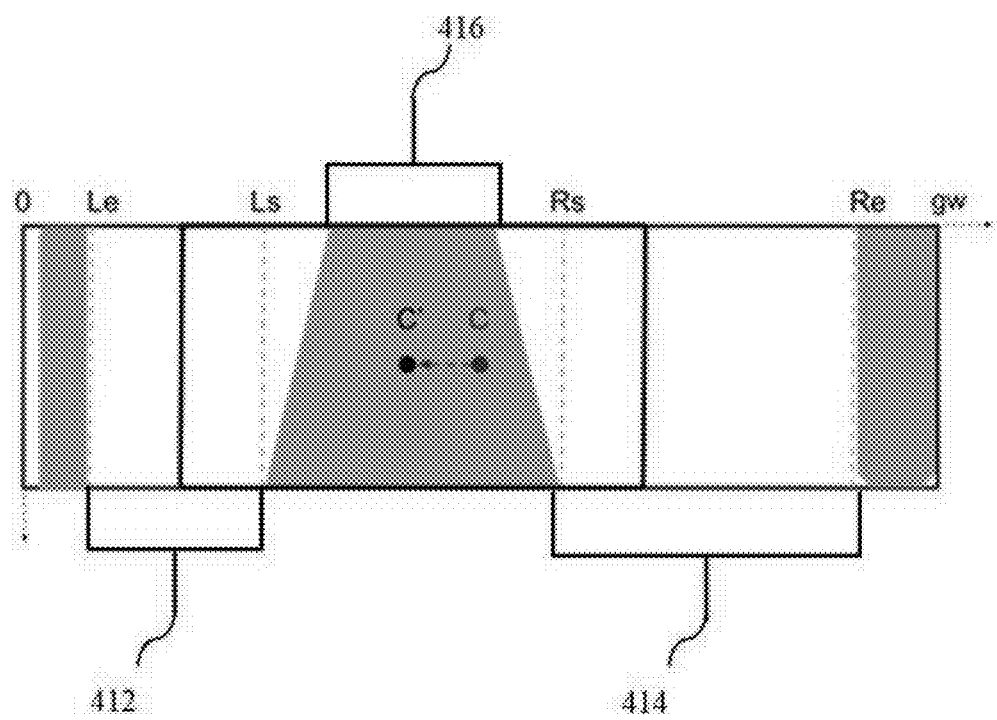
FIG. 4C illustrates example subregion computation for the processor implemented method for point cloud based grasp planning framework implemented by the system of FIG. 1 according to some embodiments of the present disclosure.
Figure 4D:
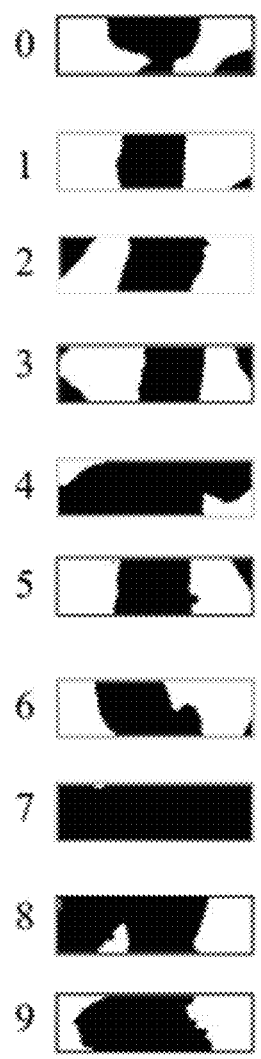
FIG. 4D illustrates example sampled grasp poses after subregion computation for the processor implemented method for point cloud based grasp planning framework implemented by the system of FIG. 1 according to some embodiments of the present disclosure.

FIG. 4C illustrates example subregion computation for the processor implemented method for point cloud based grasp planning framework implemented by the system of FIG. 1 according to some embodiments of the present disclosure. Now referring to FIG. 4C, initially, a left starting point (Ls) and a left ending point (Le) of a left free region 412 of each of the plurality of sampled grasp poses are identified based on the corresponding binary map. For example, the free region is a region with the binary value one. Further, a right starting point (Rs) and a right ending point (Re) of a right free region 414 of each of the plurality of sampled grasp poses are identified based on the corresponding binary map. Finally, the plurality of subregions are computed based on the left starting point, the left ending point, the right starting point and the right ending point using a subregion computation technique. Here, 416 indicates the contact region ($R_{ct}$). In an embodiment, FIG. 4D illustrates the plurality of sampled grasp poses after subregion computation. Now referring to FIG. 4D, the black region in each rectangle is the contact region and the white region is the free region.

In an embodiment, the subregion computation is performed using the pseudocode 1 given below. Here, $L_s$ and $L_e$ mark the starting point and the endpoint for the free space in the left half of the grasp pose rectangle. Similarly, the points $R_s$ and $R_e$ designate the free space in the right half of the grasp pose rectangle. Since the random sensor errors occurring as random 0 values in the depth map may affect the output of the algorithm 1, the depth map is preprocessed by a median filter of size 3×3. The three regions within the grasp pose rectangle can now mathematically be defined in the equations (3), (4) and (5). Referring to equation (5), $R_{G_i}$ is the grasp pose rectangle corresponding to each of the plurality of sampled grasp poses $G_i$, which is cropped from the depth map and is horizontally aligned in an image plane coordinate system (x→horizontally right wards, y-vertically downwards) diagonally defined with a starting point (0,0) and ending point (gw, gb) as shown in FIG. 4C.

$$R_{ct}=[(L_s+1,0),(R_s-1,gb)] \quad (3)$$

$$R_{fs}=[(L_e,0),(L_s,gb)]+[(R_s,0),(R_e,gb)] \quad (4)$$

$$R_{cl}=R_{G_i}-(R_{ct}+R_{fs}) \quad (5)$$

---

Pseudocode 1

Data: Binary map $B_{gw \times gb}$
$L_s \leftarrow 0$;
$L_e \leftarrow 0$;
$R_s \leftarrow gw$;
$R_e \leftarrow gw$;

$cx \leftarrow int\left(\dfrac{gw}{2}\right)$;

for i ← (cx − 1) to 0 do
  if $\Sigma_k B_{ik}$ = gb then
    $L_s \leftarrow 0$;
    break;
  end
end
for j ← (i − 1) to 0 do
  if $\Sigma_k B_{ik}$ < gb then
    $L_e \leftarrow j + 1$;
    break;
  end
end
for i ← cx + 1 to gw do
  if $\Sigma_k B_{ik}$ = gb then
    $R_s \leftarrow i$;
    break;
  end
end
for j ← (i + 1) to gw do Pseudocode 1

```
if Σ_k B_jk < gb then
    R_e ← j − 1;
    break;
end
end
```

Figure 4E:
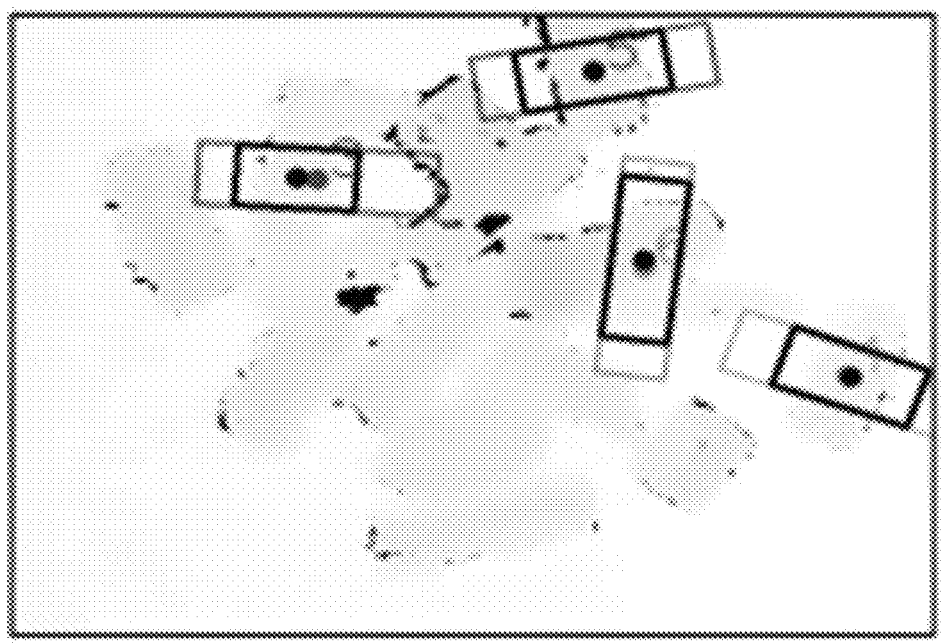
FIG. 4E illustrates example feasible grasp poses for the processor implemented method for point cloud based grasp planning framework implemented by the system of FIG. 1 according to some embodiments of the present disclosure.

At step 312 of the method 300, the feasible grasp pose selection module 204 executed by the one or more hardware processors 102 is configured by the programmed instructions to select the plurality of feasible grasp poses from the plurality of sampled grasp poses based on the plurality of subregions and the plurality of conditions. In an embodiment, the plurality of conditions for selecting the plurality of feasible grasp poses from the plurality of sampled grasp poses includes (i) if a width associated with the contact region corresponding to each of the plurality of sampled grasp poses is less than a maximum griper opening, and (ii) if the width associated with the left free region and the right free region corresponding to each of the plurality of sampled grasp poses are greater than a gripper finger width. In an embodiment, FIG. 4E illustrates example feasible grasp poses for the processor implemented method for point cloud based grasp planning framework implemented by the system of FIG. 1 according to some embodiments of the present disclosure.

At step 314 of the method 300, the feasible grasp pose refinement module 204 executed by the one or more hardware processors 102 is configured by the programmed instructions to refine each of the plurality of feasible grasp poses by (i) shifting the center (C) corresponding to each of the plurality of feasible grasp poses to a new center (C') (as shown in FIG. 4C) along the width of the corresponding grasp pose such that the corresponding contact region is divided into two equal halves and (ii) adjusting the width corresponding to each of the plurality of feasible grasp poses such that the corresponding collision region is excluded. For example, if $C=(x_c, y_c)$ is the old center point in the rectangle $R_{G_i}$, then the new center C is obtained using the following equation (6). Further, the width adjustment is performed based in equation (7).

$$C' = (x'_c, y'_c) = \left(\left[\frac{L_s + R_s}{2}\right], y_c\right) \quad (6)$$

$$W_i = 2 * \min\left(x'_c - \frac{L_s + L_e}{2}, \frac{R_s - R_s}{2}, x'_c\right) \quad (7)$$

At step 316 of the method 300, the optimum grasp pose selection module 204 executed by the one or more hardware processors 102 is configured by the programmed instructions to obtain the optimum grasp pose based on a refined plurality of feasible grasp poses using the Grasp Quality Score (GQS).

Figure 5:
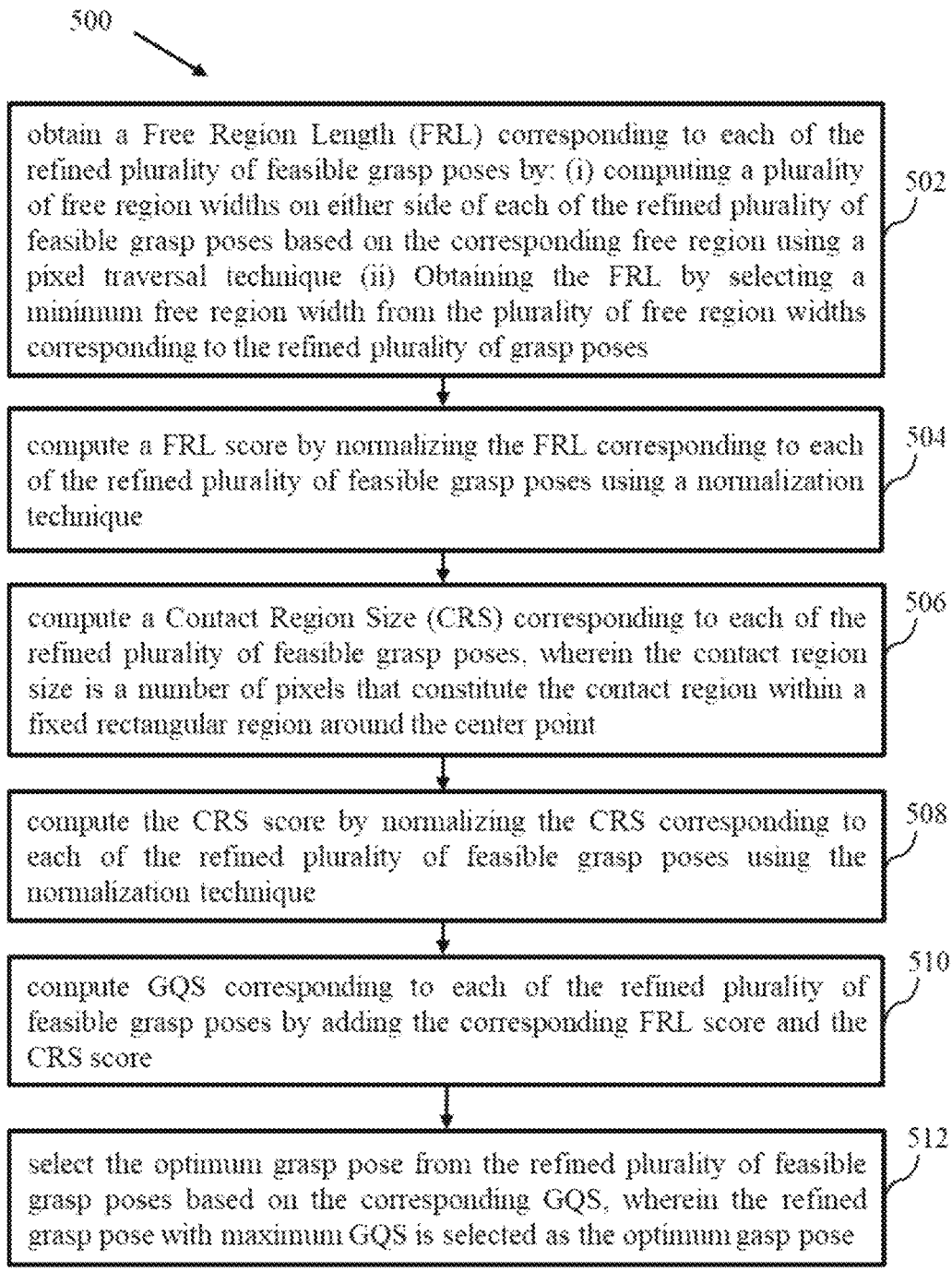
FIG. 5 is an exemplary flow diagram illustrating a method 500 for selecting optimum grasp pose selection implemented by the system of FIG. 1 according to some embodiments of the present disclosure.

FIG. 5 is an exemplary flow diagram illustrating a method 500 for selecting optimum grasp pose selection implemented by the system of FIG. 1 according to some embodiments of the present disclosure. Now referring to FIGS. 6A and 6B, at step 502 of the method 500, the one or more hardware processors 102 are configured by the programming instructions to obtain a Free Region Length (FRL) corresponding to each of the refined plurality of feasible grasp poses by: (i) computing a plurality of free region widths on either side of each of the refined plurality of feasible grasp poses based on the corresponding free region using a pixel traversal technique (ii) Obtaining the FRL by selecting a minimum free region width from the plurality of free region widths corresponding to the refined plurality of grasp poses.

At step 604 of the method 600, the one or more hardware processors 102 are configured by the programming instructions to compute a FRL score by normalizing the FRL corresponding to each of the refined plurality of feasible grasp poses using a normalization technique. For example, the FRL normalization is performed using the equation (8). Now referring to equation (8), i=1 . . . n.

$$FRL \text{ score} = \frac{FRL_i}{\max(FRL_{i...n})} * 100 \quad (8)$$

At step 606 of the method 600, the one or more hardware processors 102 are configured by the programming instructions to compute a Contact Region Size (CRS) corresponding to each of the refined plurality of feasible grasp poses, wherein the contact region size is a number of pixels that constitute the contact region within a fixed rectangular region around the center point.

At step 608 of the method 600, the one or more hardware processors 102 are configured by the programming instructions to compute the CRS score by normalizing the CRS corresponding to each of the refined plurality of feasible grasp poses using the normalization technique. For example, the CRS normalization is performed using the equation (9), Now referring to equation (9), i=1 . . . n and 'N' is the total number of pixels within the fixed dimension of an imaginary rectangle centered around the centroid of the corresponding feasible grasp pose (Rectangle).

$$CRS \text{ score} = \frac{CRS_i}{N} * 100 \quad (9)$$

At step 610 of the method 600, the one or more hardware processors 102 are configured by the programming instructions to compute the GQS corresponding to each of the refined plurality of feasible grasp poses by adding the corresponding FRL score and the CRS score.

Figure 6:
FIG. 6 illustrates sample Grasp Quality Score (GQS) for the processor implemented method for point cloud based grasp planning framework implemented by the system of FIG. 1 according to some embodiments of the present disclosure.
Figure 6:
Figure 6:
Figure 6:

At step 612 of the method 600, the one or more hardware processors 102 are configured by the programming instructions to select the optimum grasp pose from the refined plurality of feasible grasp poses based on the corresponding GQS, wherein the refined grasp pose with maximum GQS is selected as the optimum gasp pose. FIG. 6 illustrates sample Grasp Quality Score (GQS) for the processor implemented method for point cloud based grasp planning framework implemented by the system of FIG. 1 according to some embodiments of the present disclosure. Now referring to FIG. 6, the grasp pose 1 is having maximum score 200 by adding the FRL score 100 and the CRS score 100 and hence selected as the optimum grasp pose.

In an embodiment, if the system 100 fails to find at least one feasible grasp pose, a disperse action is performed by the robot. This situation arises many a time, mainly due to the dense clutter or the tightly packed configuration of the scene objects. To achieve the disperse action, a push policy (for example, a linear push policy) is employed which uses only the depth-map as its input along with some of the intermediate results generated in the previous run of the grasp planning pipeline. Due to this, the push policy not only remains consistent with the grasp planning pipeline but also requires lesser additional computations.

In an embodiment, the linear push policy requires finding a start point and an endpoint in the workspace. Initially, the start point is set to the center point of the best available grasp pose (based on the GQS score) from the previous run of the grasp planning. The grasp pose at a location in the workspace indicates the presence of an object at that location. Selecting the best available grasp pose increases the chances of free space near the vicinity of the objects. This condition is favorable for the execution of the push action. To find a suitable endpoint, a distance transform map is generated. At each point in the work-space, distance transform is defined as the minimum distance of that point from any scene object or workspace boundaries. The point having the highest value in the distance transform map is set as the end-point for the push action. With the start point and endpoint, the push vector is completely defined.

In an embodiment, the push vector is refined as follows: The start point lies on the object surface as it is set to the center of the best available grasp pose. To push the object/s effectively, the gripper finger needs to enter at a depth greater than the depth of the target object's surface. To find a better start point, the method iterate along the opposite of the push vector direction to mark a free space region that is wide enough to accommodate the gripper finger. To find the free space region, a strategy is used that is similar to the one used to mark the free space region in the grasp planning step. The middle point of the free space region is selected as the new start point. Also, to constrain the push vector length to a particular value, the endpoint can be adjusted along the push vector direction.

Experimentation Details

In an embodiment, the experimental setup for the present disclosure is shown in FIG. 2B. In an embodiment, the reliability of the present disclosure has been tested by conducting more than 500 grasp attempts on a bin-picking task with 40 novel test objects. For each trial, 15-20 objects are placed as a random pile in the bin. Robot attempts grasp until either all the objects are grasped, the maximum number of iterations are reached (i.e., 60) or 6 consecutive failures have occurred. The test object set is divided into two parts, namely level-1 and level-2 based on their size, geometry, weight, and material.

To create the dense clutter, the objects are initially kept all together in a basket which is then turned upside down into the bin. At each iteration, a depth map of the scene is taken as input and a single grasp action is returned by the grasping algorithm, consisting of a gripper pose in the robot base frame. The robot then executes the grasp action using the standard Robot Operating System (ROS) control libraries to move the robot to the target pose, grasp the object, and put it into the receptacle. For disperse action, first, the gripper's fingers are closed, and their end is placed at the start location of the predicted disperse action. Thereafter, the robot performs a linear motion from the start location to the end location of the disperse action, effectively, pushing the objects in its way.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of point cloud based grasp planning framework. The present disclosure provides a novel grasp quality evaluation method that also incorporates a grasp validation and a pose refinement method. The present disclosure neither requires 3D models of the objects nor any domain-specific learning or pre-processing (e.g. object segmentation). Given the randomly placed pile of unknown objects, the present disclosure samples a certain number of grasps poses and then looks for a collision-free and stable grasp pose. The entire method uses only point cloud data (RGB data is not used), thus it is unbiased to color, texture, and certain extent, to the lighting conditions. Further, the present grasp quality evaluation method uses sequential definite sampling of collision candidate points detecting the collision regions with certainty and resulted in a much better grasp reliability performance and is roughly much times faster than conventional approaches. Furthermore, the present disclosure generates a variable number of grasp poses for clustering-based grasp pose sampler, depending upon the area covered by the depth segmented object regions. This has been found to be more effective than having a fixed number of grasp poses. It is to be understood that the scope of the protection is extended to such a program and in addition to a computer-readable means having a message therein such computer-readable storage means contain program-code means for implementation of one or ore steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed, Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   receiving, by one or more hardware processors, an input image pertaining to a surface in a robotic bin picking environment, wherein the surface comprises a plurality of heterogenous unseen objects;
   generating, by the one or more hardware processors, a plurality of sampled grasp poses in a random configuration based on the input image, using a baseline grasp planning technique, wherein each of the plurality of sampled grasp poses is represented as rectangles;
   computing, by the one or more hardware processors, a depth difference value for each of a plurality of pixels corresponding to each of the plurality of sampled grasp poses, based on a comparison between each of the plurality of pixels corresponding to each of the plurality of sampled grasp poses and a corresponding center pixel;
   generating, by the one or more hardware processors, a binary map for each of the plurality of sampled grasp poses based on the depth difference value by assigning a binary value one to a plurality of pixels with a depth difference value greater than a predefined depth threshold and zero otherwise;
   obtaining, by the one or more hardware processors, a plurality of subregions corresponding to each of the plurality of sampled grasp poses based on the binary map, wherein the plurality of subregions comprises a contact region, a free region and a collision region, by:
      identifying a left starting point and a left ending point of a left free region of each of the plurality of sampled grasp poses based on the binary map, wherein the left free region is a region with the binary value one;
      identifying a right starting point and a right ending point of a right free region of each of the plurality of sampled grasp poses based on the binary map; and
      computing the plurality of subregions based on the left starting point, the left ending point, the right starting point and the right ending point using a subregion computation technique;
   selecting, by the one or more hardware processors, a plurality of feasible grasp poses from the plurality of sampled grasp poses based on the plurality of subregions and a plurality of conditions;
   refining, by the one or more hardware processors, each of the plurality of feasible grasp poses by (i) shifting a center corresponding to each of the plurality of feasible grasp poses along width of the corresponding grasp pose such that the contact region is divided into two equal halves, and (ii) adjusting the width corresponding to each of the plurality of feasible grasp poses such that the collision region is excluded; and
   obtaining, by the one or more hardware processors, an optimum grasp poses for a robotic arm based on a refined plurality of feasible grasp poses using a Grasp Quality Score (GQS).

2. The processor implemented method of claim 1, wherein the plurality of conditions for selecting the plurality of feasible grasp poses from the plurality of sampled grasp poses comprises (i) if a width associated with the contact region corresponding to each of the plurality of sampled grasp poses is less than a maximum griper opening, and (ii) if the width associated with the left free region and the right free region corresponding to each of the plurality of sampled grasp poses are greater than a gripper finger width.

3. The processor implemented method of claim 1, wherein obtaining the optimum grasp pose based on a refined plurality of feasible grasp poses using the GQS comprises:
   obtaining a Free Region Length (FRL) corresponding to each of the refined plurality of feasible grasp poses by (i) computing a plurality of free region widths on either side of each of the refined plurality of feasible grasp poses based on the free region using a pixel traversal technique, and (ii) obtaining the FRL by selecting a minimum free region width from the plurality of free region widths corresponding to the refined plurality of grasp poses;
   computing a FRL score by normalizing the FRL corresponding to each of the refined plurality of feasible grasp poses using a normalization technique;
   computing a Contact Region Size (CRS) corresponding to each of the refined plurality of feasible grasp poses, wherein the contact region size is a number of pixels that constitute the contact region within a fixed rectangular region around a center point;
   computing a CRS score by normalizing the CRS corresponding to each of the refined plurality of feasible grasp poses using the normalization technique;
   computing the GQS corresponding to each of the refined plurality of feasible grasp poses by adding the FRL score and the CRS score; and
   selecting the optimum grasp pose from the refined plurality of feasible grasp poses based on the GQS, wherein the refined grasp pose with a maximum GQS from among the plurality of feasible grasp poses is selected as the optimum grasp pose.

4. The processor implemented method of claim 1, further comprising performing a disperse action if at least one feasible grasp pose is not obtained, wherein the disperse action is performed iteratively using a linear push policy until at least one feasible grasp pose is obtained.

5. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive an input image pertaining to a surface in a robotic bin picking environment, wherein the surface comprises a plurality of heterogenous unseen objects;
generate a plurality of sampled grasp poses in a random configuration based on the input image, using a baseline grasp planning technique, wherein each of the plurality of sampled grasp poses is represented as rectangles;
compute a depth difference value for each of a plurality of pixels corresponding to each of the plurality of sampled grasp poses, based on a comparison between each of the plurality of pixels corresponding to each of the plurality of sampled grasp poses and a corresponding center pixel;
generate a binary map for each of the plurality of sampled grasp poses based on the depth difference value by assigning a binary value one to a plurality of pixels with a depth difference value greater than a predefined depth threshold and zero otherwise;
obtain a plurality of subregions corresponding to each of the plurality of sampled grasp poses based on the binary map, wherein the plurality of subregions comprises a contact region, a free region and a collision region, by:
identifying a left starting point and a left ending point of a left free region of each of the plurality of sampled grasp poses based on the binary map, wherein the left free region is a region with the binary value one;
identifying a right starting point and a right ending point of a right free region of each of the plurality of sampled grasp poses based on the binary map; and
computing the plurality of subregions based on the left starting point, the left ending point, the right starting point and the right ending point using a subregion computation technique;
select a plurality of feasible grasp poses from the plurality of sampled grasp poses based on the plurality of subregions and a plurality of conditions;
refine each of the plurality of feasible grasp poses by (i) shifting a center corresponding to each of the plurality of feasible grasp poses along width of the corresponding grasp pose such that the contact region is divided into two equal halves, and (ii) adjusting the width corresponding to each of the plurality of feasible grasp poses such that the collision region is excluded; and
obtain an optimum grasp poses for a robotic arm based on a refined plurality of feasible grasp poses using a Grasp Quality Score (GQS).

6. The system of claim 5, wherein the plurality of conditions for selecting the plurality of feasible grasp poses from the plurality of sampled grasp poses comprises (i) if a width associated with the contact region corresponding to each of the plurality of sampled grasp poses is less than a maximum griper opening, and (ii) if the width associated with the left free region and the right free region corresponding to each of the plurality of sampled grasp poses are greater than a gripper finger width.

7. The system of claim 5, wherein obtaining the optimum grasp pose based on a refined plurality of feasible grasp poses using the GQS comprises:
obtaining a Free Region Length (FRL) corresponding to each of the refined plurality of feasible grasp poses by (i) computing a plurality of free region widths on either side of each of the refined plurality of feasible grasp poses based on the free region using a pixel traversal technique, and (ii) obtaining the FRL by selecting a minimum free region width from the plurality of free region widths corresponding to the refined plurality of grasp poses;
computing a FRL score by normalizing the FRL corresponding to each of the refined plurality of feasible grasp poses using a normalization technique;
computing a Contact Region Size (CRS) corresponding to each of the refined plurality of feasible grasp poses, wherein the contact region size is a number of pixels that constitute the contact region within a fixed rectangular region around a center point;
computing a CRS score by normalizing the CRS corresponding to each of the refined plurality of feasible grasp poses using the normalization technique;
computing the GQS corresponding to each of the refined plurality of feasible grasp poses by adding the FRL score and the CRS score; and
selecting the optimum grasp pose from the refined plurality of feasible grasp poses based on the GQS, wherein the refined grasp pose with a maximum GQS from among the plurality of feasible grasp poses is selected as the optimum grasp pose.

8. The system of claim 5, further comprising performing a disperse action if at least one feasible grasp pose is not obtained, wherein the disperse action is performed iteratively using a linear push policy until at least one feasible grasp pose is obtained.

9. One or more non-transitory machine readable information storage mediums comprising one or more instructions which when executed by one or more hardware processors causes:
receiving an input image pertaining to a surface in a robotic bin picking environment, wherein the surface comprises a plurality of heterogenous unseen objects;
generating a plurality of sampled grasp poses in a random configuration based on the input image, using a baseline grasp planning technique, wherein each of the plurality of sampled grasp poses is represented as rectangles;
computing a depth difference value for each of a plurality of pixels corresponding to each of the plurality of sampled grasp poses, based on a comparison between each of the plurality of pixels corresponding to each of the plurality of sampled grasp poses and a corresponding center pixel;
generating a binary map for each of the plurality of sampled grasp poses based on the depth difference value by assigning a binary value one to a plurality of pixels with a depth difference value greater than a predefined depth threshold and zero otherwise;
obtaining a plurality of subregions corresponding to each of the plurality of sampled grasp poses based on the binary map, wherein the plurality of subregions comprises a contact region, a free region and a collision region, by:

identifying a left starting point and a left ending point of a left free region of each of the plurality of sampled grasp poses based on the binary map, wherein the left free region is a region with the binary value one;

identifying a right starting point and a right ending point of a right free region of each of the plurality of sampled grasp poses based on the binary map; and computing the plurality of subregions based on the left starting point, the left ending point, the right starting point and the right ending point using a subregion computation technique;

selecting a plurality of feasible grasp poses from the plurality of sampled grasp poses based on the plurality of subregions and a plurality of conditions;

refining each of the plurality of feasible grasp poses by (i) shifting a center corresponding to each of the plurality of feasible grasp poses along width of the corresponding grasp pose such that the contact region is divided into two equal halves, and (ii) adjusting the width corresponding to each of the plurality of feasible grasp poses such that the collision region is excluded; and obtaining an optimum grasp poses for a robotic arm based on a refined plurality of feasible grasp poses using a Grasp Quality Score (GQS).

10. The one or more non-transitory machine readable information storage mediums of claim 9, wherein the plurality of conditions for selecting the plurality of feasible grasp poses from the plurality of sampled grasp poses comprises (i) if a width associated with the contact region corresponding to each of the plurality of sampled grasp poses is less than a maximum griper opening, and (ii) if the width associated with the left free region and the right free region corresponding to each of the plurality of sampled grasp poses are greater than a gripper finger width.

11. The one or more non-transitory machine readable information storage mediums of claim 9, wherein obtaining the optimum grasp pose based on a refined plurality of feasible grasp poses using the GQS comprises:

obtaining a Free Region Length (FRL) corresponding to each of the refined plurality of feasible grasp poses by (i) computing a plurality of free region widths on either side of each of the refined plurality of feasible grasp poses based on the free region using a pixel traversal technique, and (ii) obtaining the FRL by selecting a minimum free region width from the plurality of free region widths corresponding to the refined plurality of grasp poses;

computing a FRL score by normalizing the FRL corresponding to each of the refined plurality of feasible grasp poses using a normalization technique;

computing a Contact Region Size (CRS) corresponding to each of the refined plurality of feasible grasp poses, wherein the contact region size is a number of pixels that constitute the contact region within a fixed rectangular region around a center point;

computing a CRS score by normalizing the CRS corresponding to each of the refined plurality of feasible grasp poses using the normalization technique;

computing the GQS corresponding to each of the refined plurality of feasible grasp poses by adding the FRL score and the CRS score; and selecting the optimum grasp pose from the refined plurality of feasible grasp poses based on the GQS, wherein the refined grasp pose with a maximum GQS from among the plurality of feasible grasp poses is selected as the optimum grasp pose.

12. The one or more non-transitory machine readable information storage mediums of claim 9, further comprising performing a disperse action if at least one feasible grasp pose is not obtained, wherein the disperse action is performed iteratively using a linear push policy until at least one feasible grasp pose is obtained.

* * * * *